Figure 1:
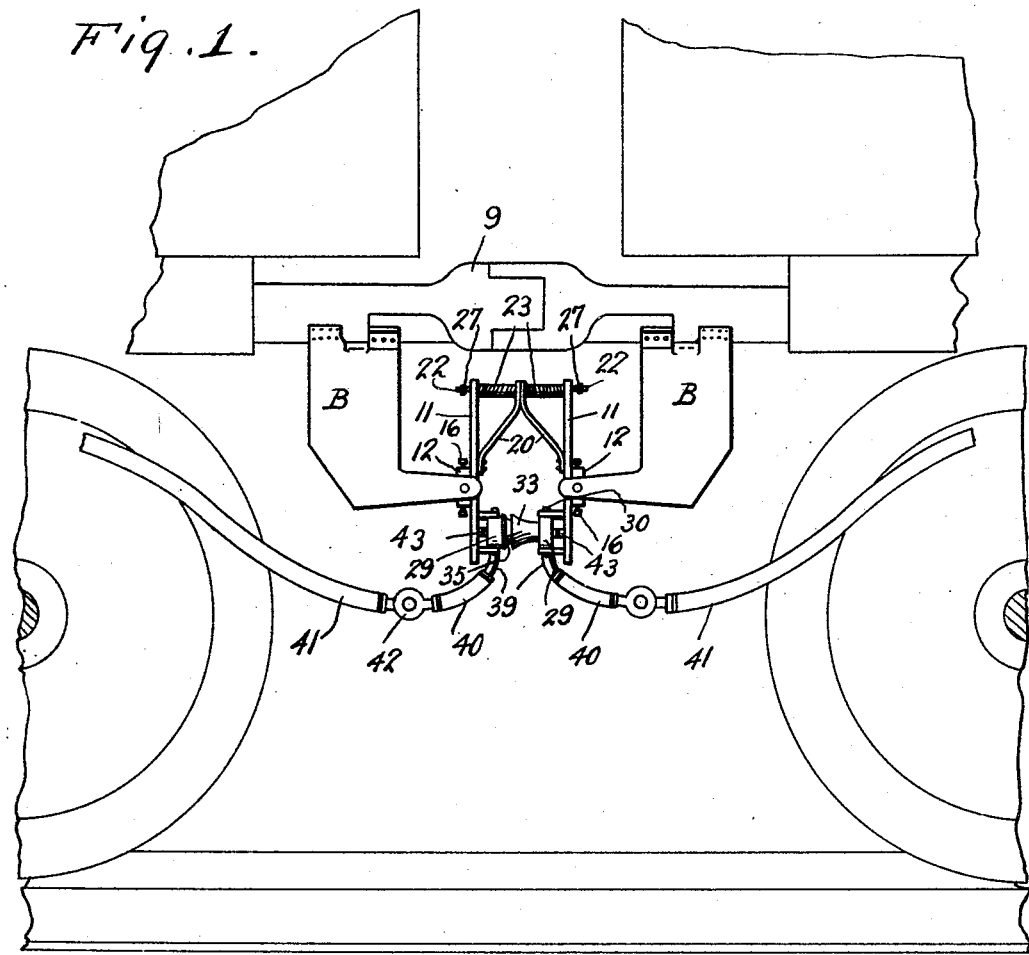

March 24, 1931. G. D. YOUNG 1,797,630
AIR BRAKE HOSE COUPLING
Filed March 22, 1928   3 Sheets-Sheet 1

Inventor
Glenn D. Young
By Clarence A. O'Brien
Attorney

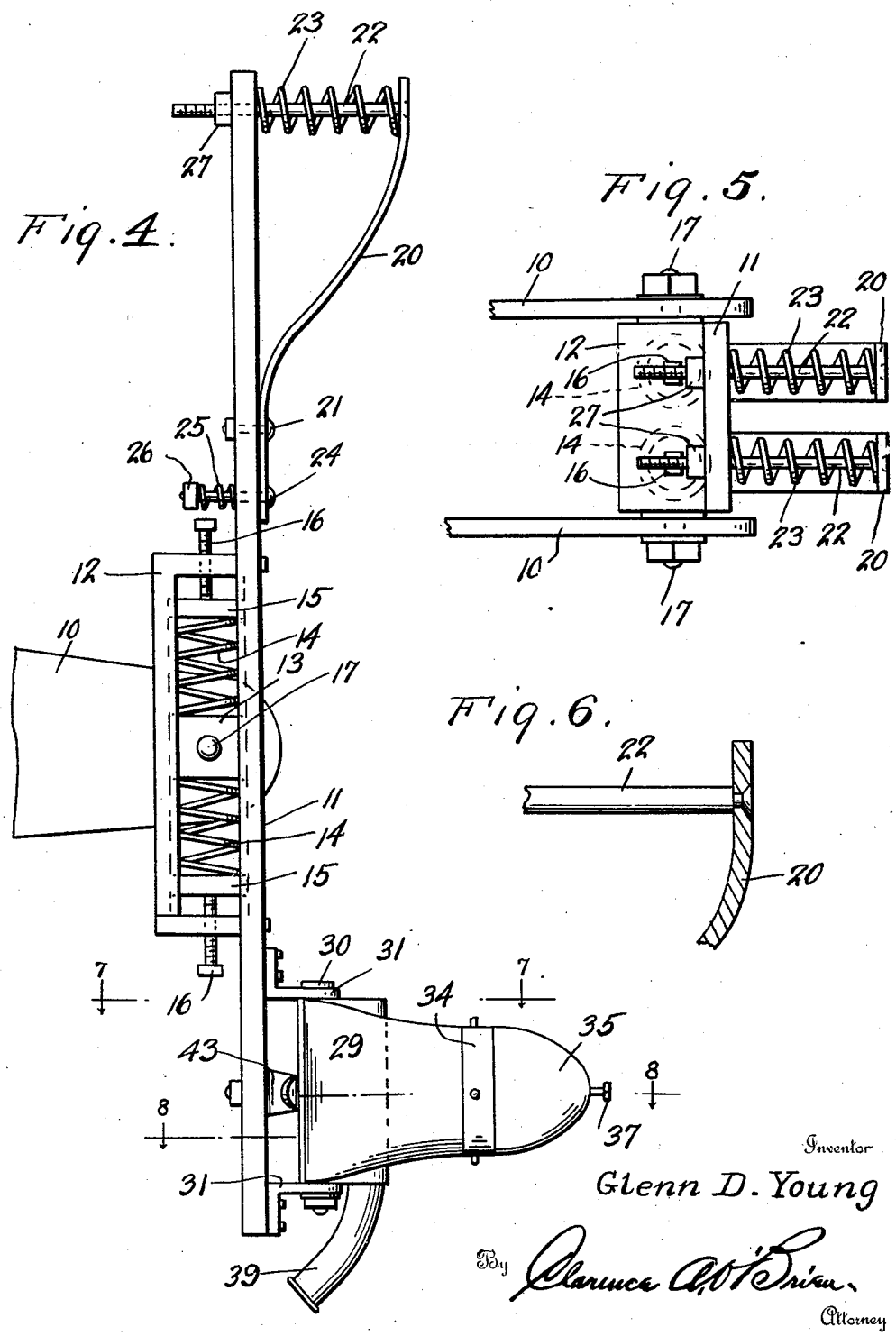

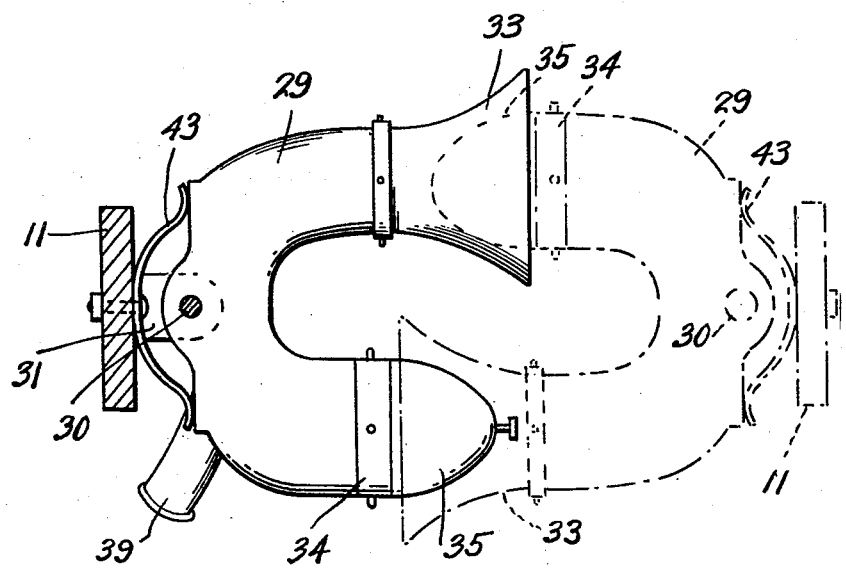
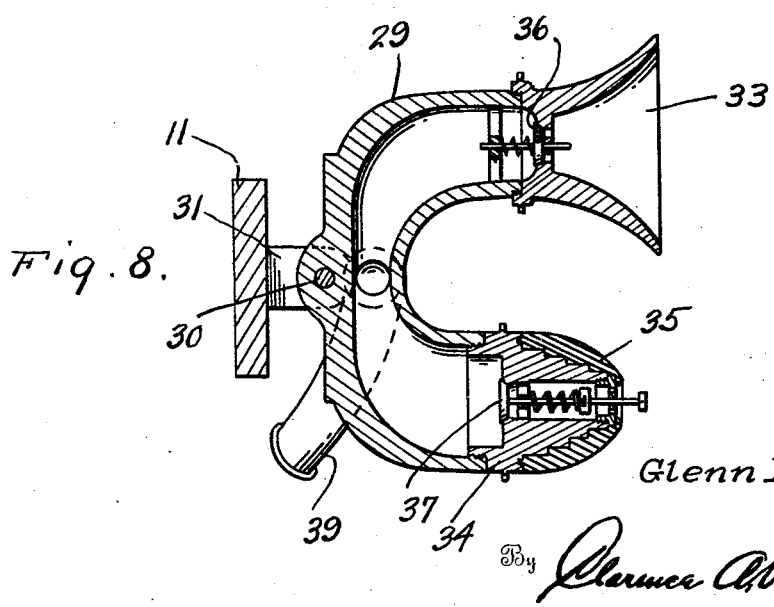

Patented Mar. 24, 1931

1,797,630

UNITED STATES PATENT OFFICE

GLENN D. YOUNG, OF FIRTH, NEBRASKA

AIR-BRAKE-HOSE COUPLING

Application filed March 22, 1928. Serial No. 263,883.

The present invention relates to a hose coupling for the air brake systems of railroad cars and the like and has for its prime object to provide a coupling which will automatically engage and disengage as the cars of a train are coupled and uncoupled without attention on the part of a trainman.

Another very important object of the invention resides in the provision of an automatic coupling of this nature which is mounted in a resilient manner so as to compensate for the movement between the cars when running.

Another very important object of the invention resides in the provision of an automatic coupling of this nature having resilient means which insures a tight fit between the parts of the coupling.

A still further very important object of the invention resides in the provision of an air brake hose coupling of this nature which is exceedingly simple in its construction, inexpensive to manufacture, easy to install, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
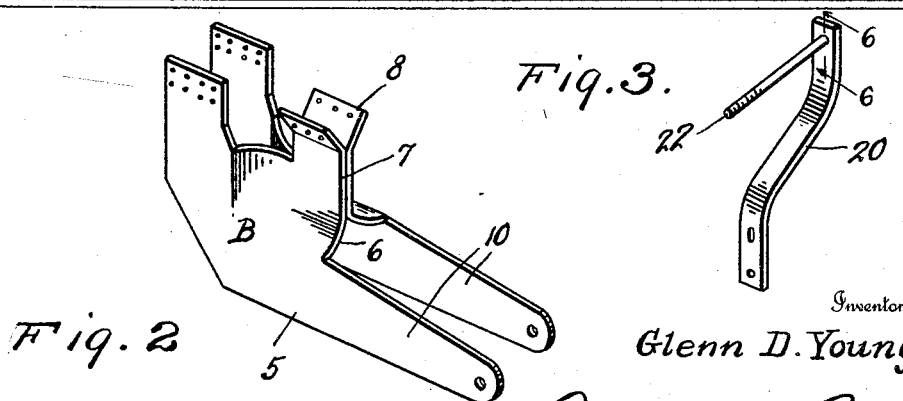
Figure 3:
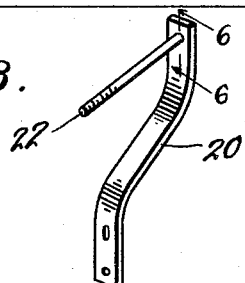

In the drawings:

Figure 1 is a fragmentary side elevation showing my coupling assembly coupled together, Figure 2 is a detail perspective view of the supporting bracket, Figure 3 is a detail perspective view of one of the main frame members, Figure 4 is an enlarged detail side elevation of one of the coupling units, Figure 5 is a top plan view thereof, Figure 6 is a detail sectional view taken substantially on the line 6—6 of Figure 3, Figure 7 is a sectional view taken substantially on the line 7—7 of Figure 4, and Figure 8 is a sectional view taken substantially on the line 8—8 of Figure 4.

Referring to the drawings in detail, it will be seen that I provide a novel bracket structure B which includes two sections 5 the major portions of which are disposed in spaced parallelism. These sections 5 have upwardly inclined portions 6 which lead into upwardly extending abutting portions 7 suitably secured together and terminating in upwardly diverging portions 8 to be secured to the bottom of the draw bar 9.

The sections 5 have ends projecting upwardly for securing to the draw bar 9. The sections are provided with arms 10 extending from the lower end thereof. A plate 11 is provided on one side intermediate its ends with a guideway frame 12 in which is slidable a block 13. Springs 14 are disposed one above and one below the block 13 and impinge against adjustable followers 15 held in place by screw bolts 16 engaged in the ends of the frame. A bolt 17 extends through the block and through the ends of the arms 10 so that the bracket is disposed between said arms as is clearly indicated in the drawings particularly in Figure 5.

As is also indicated to advantage in Figure 5 it is preferable to use four of the springs 14, one pair above and one pair below the block 13. A pair of springs 20 are secured adjacent the upper end of the plate as at 21 and curve outwardly and upwardly and have anchored in their upper ends bolts 22 as indicated in Figure 6 and these bolts are slidable through the upper ends of the plate and have springs 23 thereabout impinging against the plate and the upper ends of the springs 20 to strengthen the springs 20. Bolts 24 extend through the lower ends of the springs 20 and are slidable through openings in the plate below the anchoring bolts 23 of one and have spring 25 thereabout impinging against the plate 11 and against nuts 26 on the ends of the bolt.

Nuts 27 are provided on the ends of the bolt 22 to limit their movement in one direction as may be apparent.

A coupling member comprises a hollow U-shaped body 29 which is rockably secured by a bolt 30 between vertically spaced brackets 31 on the lower end of the plate 11. At one end of the body 29 there is threadedly engaged a funnel shaped member 33 and at the other end thereof there is threadedly engaged a head 34. The head 34 is somewhat bullet shaped and has a rubber facing 35 thereon to fit in one of the funnel members 33. A spring pressed check valve 36 is provided in the funnel and a spring pressed check valve 37 is provided in the shaft 34. The stems of these valves of mating coupling members are adapted to engage when the head 34 enters the funnel shaped member 33 so as to communicate the coupling members together and therefore communicate together the air lines of the air brake system.

Conductors 39 project downwardly from the coupling members 29 in communication therewith and hose 40 are engaged therewith and with the air line 41 by conventional air hose coupling 42. A spring 43 is mounted on the plate and bears against the rear of the coupling member as is indicated to advantage in Figure 7, allowing the coupling member to swing but tending to hold it in a predetermined position.

It will thus be seen that the coupling member is yieldable in practically all directions necessary to accommodate the varying motions between the cars in the train and thus the coupling has the necessary flexibility. It will further be seen that when two parts come together the springs 20 will meet and be pressed toward their respective plates 11 thus tending to rock the plates and tightly engage the bullet head of one coupling with the funnel member of the other coupling and vice versa.

It is thought that the construction, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A coupling member of the class described comprising a U-shaped hollow body with a hose connecting branch extending from the intermediate portion thereof, a funnel shaped member detachably engaged on one end of the body, a bullet shaped head detachably engaged on the other end of the body, a valve mounted in the funnel shaped member and a valve in the bullet shaped head, both valves opening inwardly, said head having a rubber facing thereon, a bracket, and means for yieldably mounting the coupling member in the bracket, said U-shaped member having its inner side portion at its bight offset to provide a narrow by-pass inside of the member at its intermediate portion, said U-shaped member having the hose connecting branch communicating with the interior thereof at the narrow by-pass.

In testimony whereof I affix my signature.

GLENN D. YOUNG.